(12) United States Patent
Linzenkirchner et al.

(10) Patent No.: US 7,757,556 B2
(45) Date of Patent: Jul. 20, 2010

(54) METHOD AND SYSTEM FOR DIAGNOSING MECHANICAL, ELECTROMECHANICAL OR FLUIDIC COMPONENTS

(75) Inventors: Edmund Linzenkirchner, Eggenstein-Leopoldshafen (DE); Alf Püttmer, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 350 days.

(21) Appl. No.: 11/919,857

(22) PCT Filed: May 2, 2006

(86) PCT No.: PCT/EP2006/061985
§ 371 (c)(1),
(2), (4) Date: Nov. 2, 2007

(87) PCT Pub. No.: WO2006/117376
PCT Pub. Date: Nov. 9, 2006

(65) Prior Publication Data
US 2009/0090186 A1    Apr. 9, 2009

(30) Foreign Application Priority Data
May 4, 2005   (DE) .................. 10 2005 020 901

(51) Int. Cl.
*G01H 11/08*   (2006.01)
*G01N 29/14*   (2006.01)
(52) U.S. Cl. ....................................... 73/587
(58) Field of Classification Search .................. 73/587
See application file for complete search history.

(56) References Cited

U.S. PATENT DOCUMENTS

| 3,946,600 | A | * | 3/1976 | Rettig et al. | ................. | 73/587 |
|---|---|---|---|---|---|---|
| 4,083,031 | A |   | 4/1978 | Pharo, Jr. |   |   |
| 4,417,478 | A | * | 11/1983 | Jon et al. | ...................... | 73/801 |
| 4,642,617 | A |   | 2/1987 | Thomas et al. |   |   |
| 4,738,137 | A | * | 4/1988 | Sugg et al. | .................... | 73/587 |
| 4,884,449 | A | * | 12/1989 | Nishimoto et al. | ............ | 73/660 |

(Continued)

FOREIGN PATENT DOCUMENTS

| EP | 0 366 286 A2 | 5/1990 |
|---|---|---|
| EP | 1 216 375 B1 | 6/2002 |

*Primary Examiner*—Hezron Williams
*Assistant Examiner*—Rose M Miller

(57) ABSTRACT

There is described a diagnosis method and a system including a structure-born noise sensor which transmits, in a bandpass filtered manner, a measuring signal based on the mechanical resonance frequency and capacity thereof and on an inductance and an evaluating device in which the frequency, at which the measuring signal level exceeds a predetermined threshold value, is defined and which is used for producing an error signal, when the frequency exceeds a second predetermined threshold value. As far as the diagnosis performance requires a small number of electronic components and a low power supply, the diagnostic is integrated into existing devices, in particular into process instrumentation field devices for which a restricted quantity of operating power is available. The method and the system are used for identifying a valve leakage with the aid of an electro-pneumatic positional regulator.

9 Claims, 2 Drawing Sheets

U.S. PATENT DOCUMENTS

| | | | |
|---|---|---|---|
| 5,154,080 A * | 10/1992 | Hill et al. .................. 73/597 |
| 5,477,729 A | 12/1995 | Cavalloni |
| 6,138,516 A | 10/2000 | Tillman |
| 6,220,098 B1 * | 4/2001 | Johnson et al. ............ 73/592 |
| 6,234,021 B1 * | 5/2001 | Piety et al. ................. 73/592 |
| 2003/0019297 A1 * | 1/2003 | Fiebelkorn et al. ......... 73/587 |
| 2005/0011266 A1 | 1/2005 | Robinson et al. |
| 2009/0090185 A1 * | 4/2009 | Puttmer ..................... 73/587 |

* cited by examiner

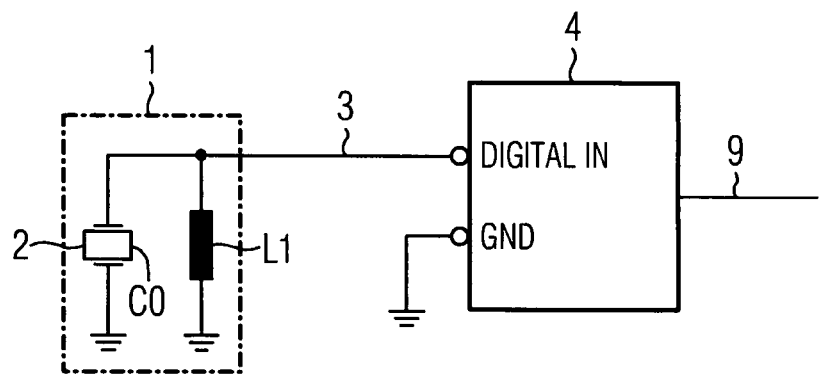
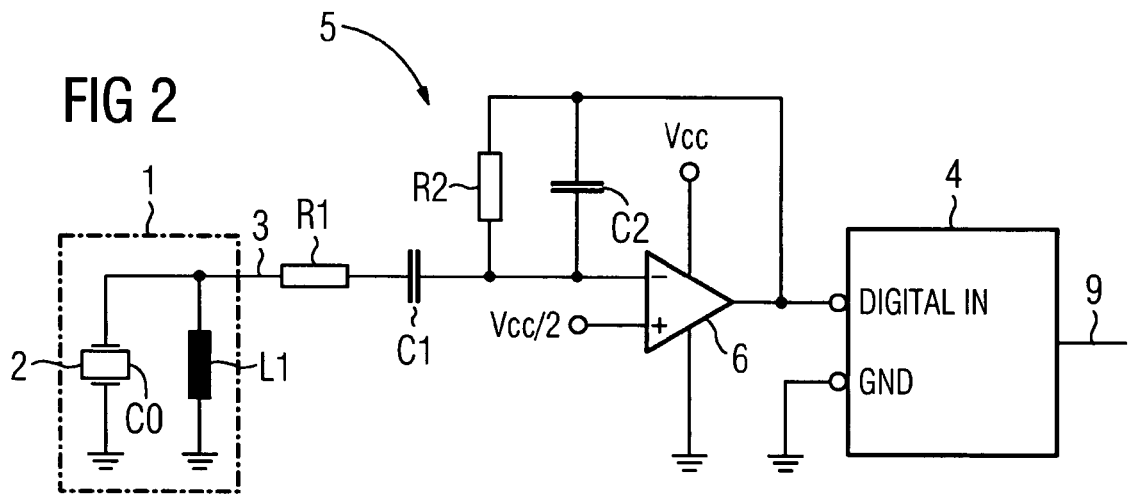

US 7,757,556 B2

METHOD AND SYSTEM FOR DIAGNOSING MECHANICAL, ELECTROMECHANICAL OR FLUIDIC COMPONENTS

CROSS REFERENCE TO RELATED APPLICATIONS

This application is the U.S. National Stage of International Application No. PCT/EP2006/061985, filed May 2, 2006 and claims the benefit thereof. The International Application claims the benefits of German application No. 10 2005 020 901.7 DE filed May 4, 2005, both of the applications are incorporated by reference herein in their entirety.

FIELD OF INVENTION

The invention relates to a method for diagnosing mechanical, electromechanical or fluidic components, in particular a valve which can be activated by a position adjuster via a drive mechanism and a system for diagnosing such components.

BACKGROUND OF INVENTION

By analyzing structure-borne noise, it is possible to identify features which assist in the detection of faults or errors in mechanical, electromechanical or fluidic components. For example, EP 1 216 375 B1 discloses a diagnosis system for a valve which can be activated by a position adjuster via a drive mechanism, in which the intensity of the structure-borne noise in a spectral range above 50 kHz is used for detecting a leakage in the valve. However, the known diagnosis system requires a spectral analysis of the measurement signal and hence a considerable expense in terms of electronics and computing power. This also involves an increase in the electrical power consumption of the analysis entity. Integration of the diagnosis method as an additional function in existing devices is therefore seldom possible, since the additional power is often unavailable. In particular, this applies to field devices of automation systems, e.g. measurement transformers or control elements. These must satisfy explosion protection requirements in many cases, or are supplied with the necessary auxiliary energy via a 4 to 20 mA interface or a PROFIBUS connection. The diagnosis system must then be housed in an additional device at additional expense.

U.S. Pat. No. 5,477,729 discloses a sensor for structure-borne noise, which sensor is suitable for measuring high-frequency acoustic signals up to approximately 2 MHz.

SUMMARY OF INVENTION

A problem addressed by the invention is providing a method and a system for diagnosing mechanical, electromechanical or fluidic components, said method and system being characterized by low expense.

An advantage of the invention is that, in order to carry out the method, significantly less switching and energy expense is required than was previously the case. This advantage is achieved by virtue of combining and considerably simplifying the functions to be realized, e.g. having a component perform a plurality of functions simultaneously. For example, in addition to the actual conversion of the structure-borne noise into an electrical signal, a sensor for structure-borne noise also has the simultaneous function of bandpass filtering. This is easily achieved by coordinating the mechanical resonance frequency and the capacitance of the sensor, and an inductance, in a suitable manner. This means that the sensor for structure-borne noise already generates a measurement signal which predominantly includes signal portions in the relevant frequency range for the application concerned. Further filter elements are therefore not essential. In the analysis entity, the measurement signal is supplied to a comparator and the frequency with which the measurement signal level exceeds a first predefined threshold value is determined. In this case, the invention involves the insight that an increase in the amplitude of the measurement signal results in an increase in the probability that a sampled value will be higher than the constant threshold value. An error report signal is generated if the ascertained frequency exceeds a second predefined threshold value. The frequency with which the level exceeds the first predefined threshold value can easily be ascertained with the aid of a comparator whose output signal is polled. In order to express the frequency, e.g. a simple statistical characteristic value K is suitable, which value can be calculated as the ratio of the number of sample values having a level which exceeds the first predefined threshold value to the total number of sample values observed. Alternatively, the number of occasions on which the threshold value was exceeded within a time period can be counted using an interrupt routine of a microcontroller or a counter. In a simple manner, the ascertained frequency is then compared with a second predefined threshold value in order to obtain an indication whether an error status is present in respect of the mechanical, electromechanical or fluidic component. This second threshold value can be predefined e.g. by means of manual input or by means of prior measurement and analysis on the basis of a good status.

As a result of the few electronic components that are required, and the low computing power and hence electrical power that is required, it is now possible for the diagnosis comprising structure-borne noise measurement and signal analysis to be integrated in existing devices such as e.g. sensors or actuators of the process instrumentation, in particular in a regulating valve which can be activated by a position adjuster via a drive mechanism. This integration is particularly simple if the device already includes a microcontroller which can easily undertake the calculations required for analyzing the measurement signal in addition to its existing tasks. The novel diagnosis method and system are therefore characterized by the particularly low expense which is required in order to carry out the diagnosis.

In order to determine the frequency, the measurement signal can be supplied to a digital input of a microcontroller which, at predefined time intervals, polls the value that is present. This has the advantage of avoiding the need for an additional comparator circuit and an analog/digital conversion with higher resolution. Of course, a comparator arranged outside a microcontroller can also be used as an alternative.

It is advantageous that only a small amount of computing power and hence less operating energy is required if the time intervals between the polls are longer, by a magnitude of at least one, than the maximal period duration of the signal portions of the relevant frequency range in the measurement signal. This represents a significant undersampling of the measurement signal. Within the context of the analysis for identifying features, this results in a minimization of the required computing power. Undersampling means that the measurement signal is captured with a lower sampling rate for determining the frequency than would be required according to the known Nyquist-Shannon sampling theory for analysis of the relevant frequency components of the measurement signal.

Before the frequency with which the level of the measurement signal exceeds a predefined threshold value is determined, a signal amplification of the signal which is generated by the sensor for structure-borne noise can be performed with an additional bandpass filtering in an electronic circuit featuring only one operational amplifier. This has the advantage of allowing a better selection of the signal portions in the relevant frequency range, without at the same time having to significantly increase the energy requirement for the diagnosis.

The optional operational amplifier is used both for signal amplification and, by virtue of its configuration, for bandpass filtering. The number of additional electronic components is therefore reduced to a minimum. In an improved manner, the bandpass filtering only leaves those signals remaining which relate to the phenomenon that must be detected.

The novel diagnosis method and system can be applied particularly advantageously to the detection of leaks in regulating valves, since a measurement signal frequency range above 50 kHz is relevant for this and expresses the strength of the cavitation noise. Reference is made to EP 1 216 375 B1 as cited in the introduction above for a more detailed explanation of an arrangement for valve diagnosis by means of structure-borne noise analysis and the associated advantages.

BRIEF DESCRIPTION OF THE DRAWINGS

The invention and configurations and advantages are explained in greater detail below with reference to the drawings, which illustrate an exemplary embodiment of the invention and in which:

FIG. 1 shows a block schematic diagram of a diagnosis system,

FIG. 2 shoes a diagnosis system including optional active bandpass filter, and

DETAILED DESCRIPTION OF INVENTION

Figure 3:
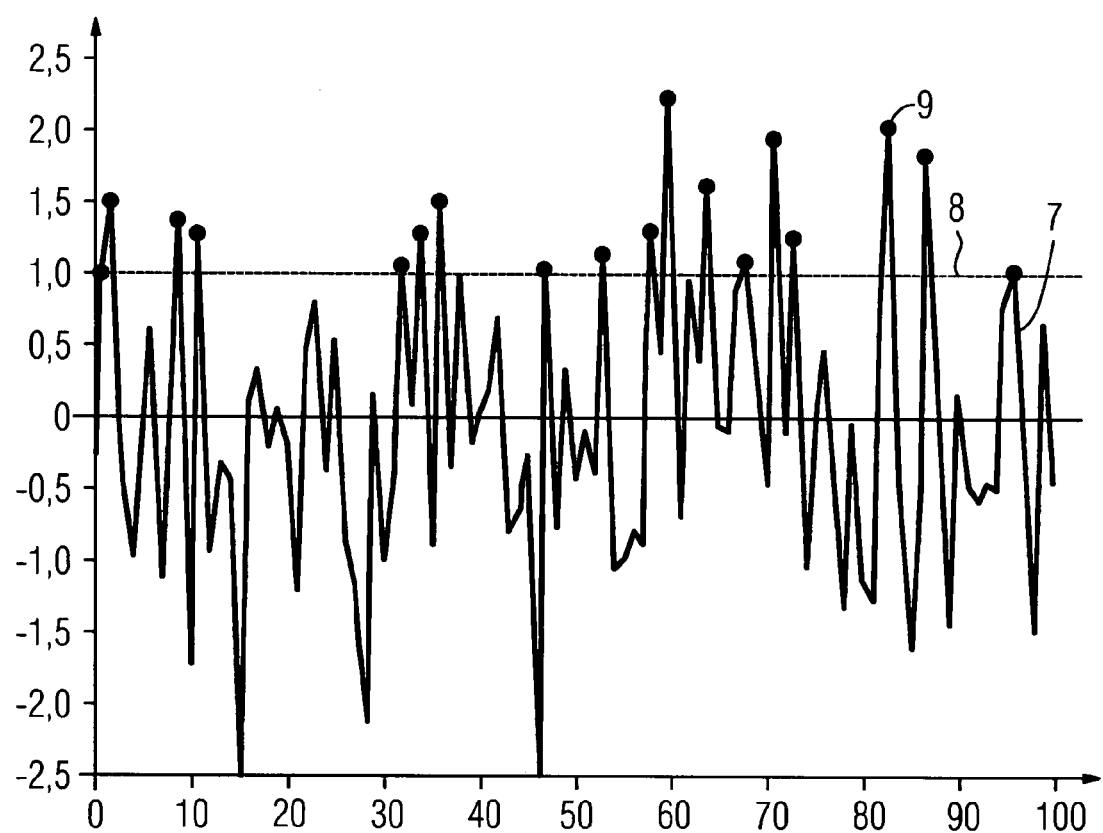
FIG. 3 shows a time diagram of a bandpass filtered measurement signal.

A sensor 1 for structure-borne noise features a piezoceramic element 2 which is equipped with electrodes. In the electrical equivalent circuit diagram, the piezoceramic element 2 has a capacitance C0 which can be modified by means of additional capacitors if necessary. An inductance L1 is connected in parallel with the piezoceramic element 2 and integrated in the sensor 1 as indicated by a broken line in FIG. 1. Alternatively, the inductance can be realized as a separate component. In order for the sensor 1 to emit a measurement signal 3 which essentially contains only signal portions in a relevant frequency range, the mechanical resonance frequency of the piezoceramic element 2, the capacitance C0 and the inductance L1 are coordinated in a suitable manner. The measurement signal 3 is supplied to a digital input DIGITAL IN of a microcontroller 4. The microcontroller 4 forms an analysis entity in which, at specific time intervals, a program-controlled poll ascertains whether a logical one or a logical zero is present at the digital input DIGITAL IN. A logical one is present at the digital input DIGITAL IN if the level of the measurement signal 3 exceeds a first predefined threshold value. On the basis of a multiplicity of such polls, the microcontroller 4 specifies a statistical characteristic value K using a simple calculation according to the formula:

$$K = \frac{M}{N},$$

where
M=number of polls which revealed a logical one, and
N=total number of polls.

An error report signal 9 is generated if the characteristic value K exceeds a second predefined threshold value.

The diagnosis system according to FIG. 1 is integrated in an electro-pneumatic position adjuster for a valve which can be activated via a pneumatic drive mechanism. The microcontroller 4 is the microcontroller which is already present in the position adjuster. In this way, it is particularly clear that the novel diagnosis system can be added to an existing position adjuster at very little expense. In principle, only the sensor 1 for structure-borne noise and a digital input of the microcontroller 4 are required. The changes that are required to the microcontroller 4 program for carrying out the diagnosis method are comparatively small-scale due to the simple calculations. The calculations demand only a small part of the computing power of the microcontroller 4.

The amplification of the measurement signal 3 is done by utilizing the resonance ratio of the oscillatory circuit which is formed by the capacitance C0 of the piezoceramic element and the inductance L1.

FIG. 2 shows a diagnosis system which is expanded by an optional amplifier circuit 5. The circuit parts which are explained above with reference to FIG. 1 have the same reference signs in FIG. 2. The additional amplifier circuit 5 essentially consists of an operational amplifier 6 whose supply connections are connected to a positive supply voltage VCC and to ground respectively. The half supply voltage VCC/2 is supplied at the reference input of the operational amplifier 6. A series connection comprising a resistor R1 and a capacitor C1 is arranged in the input path of the operational amplifier 6. A parallel connection comprising a resistor R2 and a capacitor C2 is situated in the feedback path. When correctly coordinated, this circuit of the operational amplifier 6 provides a simple means of achieving a bandpass effect which amplifies precisely the signal portions in the relevant frequency range. The optional operational amplifier 6 is therefore used both for amplifying the measurement signal 3 and, by virtue of its configuration, for bandpass filtering. The number of electronic components is therefore reduced to a minimum.

In the described application of the diagnosis system for detecting a valve leak, the sensor 1 for structure-borne noise and the electronic circuit 5 are specifically optimized for high sensitivity in respect of flow-related noises at the same time as insensitivity in respect of the working noises of pumps or similar adjacent components. The sensor 1 is permanently mounted on a prepared smooth surface on the exterior of the valve housing by means of a screw. A reliable acoustic coupling is provided by a heat-resistant jointing grease between valve housing and sensor. Alternatively, attachment to the housing of the position adjuster is possible in the case of good acoustic coupling. No additional sensor technology is required in addition to the sensor 1. The analysis can be adapted automatically to changing load conditions such as pressure and stroke count, without having to set any parameters or effect a calibration relative to a good status. The alarm thresholds can also be specified manually by a user.

FIG. 3 serves to illustrate the analysis of the frequency with which the level of the measurement signal exceeds the first predefined threshold value. It shows a profile 7 of the bandpass-filtered measurement signal comprising 100 sample values which were obtained using a sampling rate that is adapted to the relevant frequency range in the usual manner. The number of the sample value (sample) is plotted on the X-axis and its amplitude on the Y-axis. The first predefined threshold value is depicted as horizontal line 8 in FIG. 3. Sample values whose level exceeds the first predefined threshold value are marked by means of points, e.g. the sample value 9. It becomes clear that, as the amplitude of the measurement signal increases, the probability increases that sample values exceed the constant first threshold value. This type of analysis assumes bandpass filtering of the measurement signal on the relevant frequency range. When monitoring for fault-related structure-borne noise, it is therefore possible to dispense with a resource-intensive fast-Fourier analysis for examining the relevant frequency range. This results in a significant reduction in the computing power which is required to carry out the diagnosis method, and hence a reduction in the current requirement, such that the novel diagnosis method can also be used in the case of field devices having access to only a limited amount of auxiliary energy for their operation.

The invention claimed is:

1. A method for diagnosing a component, comprising:
   providing a sensor for structure-borne noise;
   providing a device for analyzing a received measurement signal;
   measuring the measurement signal via the sensor;
   outputting the measurement signal by the sensor in a bandpass filtered manner by virtue of its mechanical resonance frequency, a capacitance of the sensor and an inductance of the sensor;
   determining an occurrence with which a level of the measurement signal exceeds a first predefined threshold value; and
   generating an error report signal if the ascertained occurrence exceeds a second predefined threshold value,
   wherein the measurement signal for determining the occurrence is supplied to a digital input of a microcontroller,
   wherein the microcontroller polls a present value of the measurement signal at the digital input at predefined time intervals, and
   wherein the time intervals are longer, by a magnitude of at least one, than a maximal period duration of the signal portions of a relevant frequency range in the measurement signal.

2. The method as claimed in claim 1, wherein the sensor is comparatively insensitive in the range of low-frequency working noises but sensitive in a higher-frequency range of error noises.

3. The method as claimed in claim 2, the components are selected from the group consisting of a mechanical component, an electromechanical component, a fluidic component, and a combination thereof.

4. The method as claimed in claim 1, wherein the component is a valve, wherein the valve is activated by a position adjuster via a drive mechanism.

5. The method as claimed in claim 1, wherein a signal amplification of the measurement signal is performed with an additional bandpass filtering in an electronic circuit featuring only one operational amplifier before the level of the measurement signal is compared with the first predefined threshold value.

6. A system for diagnosing components selected from the group consisting of a mechanical component, an electromechanical component, a fluidic component and a combination thereof, comprising:
   a sensor for structure-borne noise, wherein the sensor is comparatively insensitive in the range of low-frequency working noises and sensitive in a higher-frequency range of error noises;
   a device to analyze a measurement signal from the sensor, wherein the device ascertains a frequency with which the level of the measurement signal exceeds a first predefined threshold value, and
   wherein the device generates an error report signal if the ascertained frequency exceeds a second predefined threshold value; and
   a microcontroller,
   wherein the measurement signal for determining the occurrence is supplied to a digital input of the microcontroller,
   wherein the microcontroller polls a present value of the measurement signal at the digital input at predefined time intervals, and
   wherein the time intervals are longer, by a magnitude of at least one, than a maximal period duration of the signal portions of a relevant frequency range in the measurement signal.

7. The system as claimed in claim 6, wherein the sensor outputs the measurement signal in a bandpass filtered manner.

8. The system as claimed in claim 7, wherein the bandpass is based upon the mechanical resonance frequency of the sensor, a capacitance of the sensor and an inductance of the sensor.

9. The system as claimed in claim 6, wherein the component is a valve, wherein the valve is activated based upon a position adjuster via a drive mechanism.

* * * * *